United States Patent
Hoyos Arciniegas

(10) Patent No.: US 11,212,338 B1
(45) Date of Patent: Dec. 28, 2021

(54) MANAGED SCALING OF A PROCESSING SERVICE

(71) Applicant: Amazon Technologies, Inc., Seattle, WA (US)

(72) Inventor: Johan Daniel Hoyos Arciniegas, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 625 days.

(21) Appl. No.: 15/878,323

(22) Filed: Jan. 23, 2018

(51) Int. Cl.
*G06F 15/16* (2006.01)
*H04L 29/08* (2006.01)
*H04L 12/861* (2013.01)
*H04L 29/06* (2006.01)

(52) U.S. Cl.
CPC .............. *H04L 67/10* (2013.01); *H04L 49/90* (2013.01); *H04L 67/42* (2013.01)

(58) Field of Classification Search
CPC .......... H04L 67/10; H04L 49/90; H04L 67/42
USPC .................. 709/203, 206; 718/102
See application file for complete search history.

(56) References Cited

U.S. PATENT DOCUMENTS

| | | | |
|---|---|---|---|
| 8,966,066 B2 | 2/2015 | Luna et al. | |
| 9,448,839 B2 | 9/2016 | Jain | |
| 9,847,950 B1* | 12/2017 | Markevics | ............ H04L 47/803 |
| 10,235,223 B2* | 3/2019 | Prasad | ................ G06F 9/45504 |
| 10,382,307 B1* | 8/2019 | Jindal | ..................... H04L 49/90 |
| 2006/0161920 A1* | 7/2006 | An | .......................... G06F 9/485 |
| | | | 718/102 |
| 2008/0256204 A1* | 10/2008 | Kamat | .................... H04L 51/24 |
| | | | 709/206 |
| 2014/0380322 A1* | 12/2014 | Ailamaki | ............. G06F 9/4843 |
| | | | 718/102 |
| 2017/0061364 A1* | 3/2017 | Waltz | .................. G06F 16/2453 |
| 2017/0153973 A1* | 6/2017 | Schatzl | ............... G06F 16/1727 |
| 2017/0185456 A1* | 6/2017 | Bramary | ................ G06Q 10/06 |
| 2018/0004575 A1* | 1/2018 | Marriner | ............... G06F 9/5077 |

OTHER PUBLICATIONS

"How Amazon SQS Queues Works", Retrieved form URL: http://docs.aws.amazon.com/AWSSimpleQueueService/latest/SQSDeveloperGuide/sqs-how-it-works.html on Nov. 13, 2017, pp. 1-4.

\* cited by examiner

*Primary Examiner* — David R Lazaro
*Assistant Examiner* — Mariegeorges A Henry
(74) *Attorney, Agent, or Firm* — Robert C. Kowert; Kowert, Hood, Munyon, Rankin & Goetzel, P.C.

(57) ABSTRACT

A system implements managed scaling of a processing service in response to message traffic. Producers produce messages or other data and the messages are stored in a queue or message system. On behalf of consumers of the messages, workers of a client of the queue poll the queue or message service to obtain the messages. For example, a primary worker of the client polls the queue for messages and upon receiving a message, activates a secondary worker from a pool of secondary workers to start polling the queue for message. Now both workers are obtaining messages from the queue, and both workers may activate other secondary workers, exponentially scaling the message processing service in embodiments. When a secondary worker receives an empty polling response, the secondary deactivates back to the pool. The primary thread does not deactivate, even when empty polling responses are received.

20 Claims, 8 Drawing Sheets

MANAGED SCALING OF A PROCESSING SERVICE

BACKGROUND

Large-scale systems may rely upon fleets of workers to process queues of items. For example, producing entities (e.g., applications, clients, etc.) produce data items, such as messages, requests or other data that may be stored in a messaging service (e.g., in a queue), and consuming entities (e.g., other applications, other clients, etc.) consume the data from the messaging service.

In some systems, data flows from producers may be unpredictable and/or variable. One way of dealing with unpredictable and/or variable data flows is to oversubscribe the number of workers that process the data. However, this type of design may require customers to pay for resources whether or not the resources are actually used. Another way of dealing with unpredictable and/or variable data flows is to smooth out the flow of data in a queue that stores extra items that cannot be processed for a later time period. But, this type of design may cause latency because items sit in a queue, instead of being processed.

DETAILED DESCRIPTION

Figure 1A:
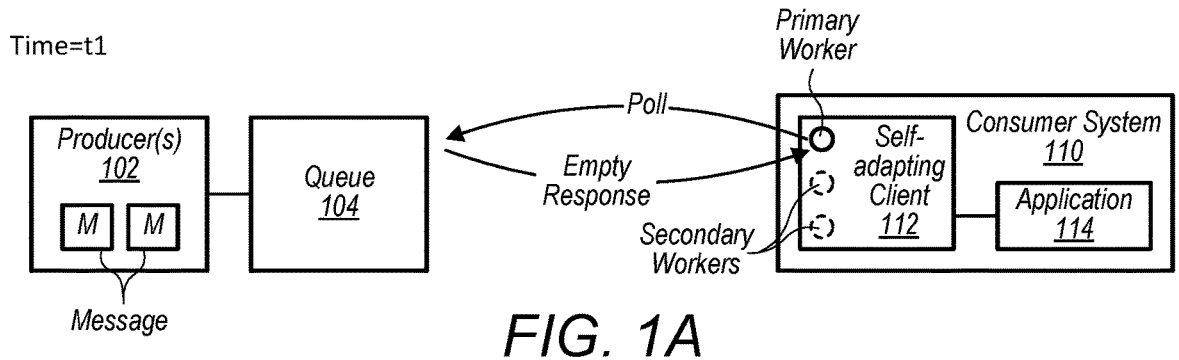
FIGS. 1A-1E illustrate a system that dynamically scales to changes in message flow, according to at least some embodiments.
Figure 1B:
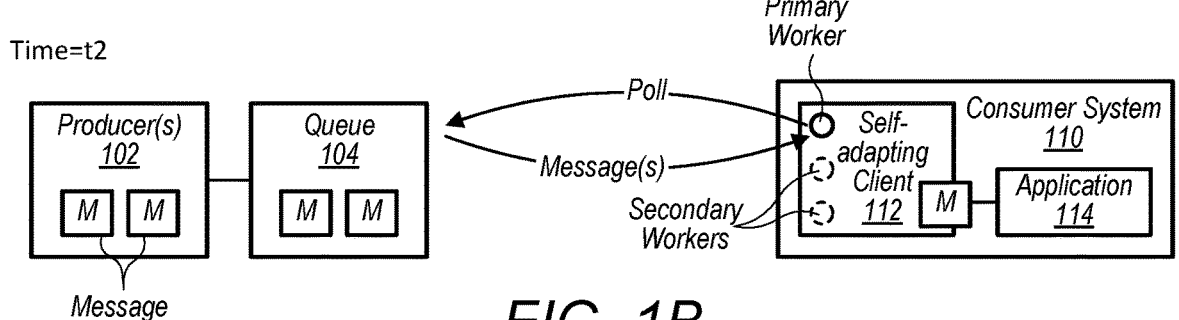

Various embodiments of managed scaling of a message processing service are described. Disclosed are techniques for managing the quantity of workers that process items from a queue. For example, a system may include producers of messages or data items and consumers of those messages or data items. In some embodiments, a queue (e.g., a message service) may be used to decouple the process of the producer(s) from the process of the consumer(s) such that the producers and consumers do not need to coordinate processing of the messages or data items.

In other embodiments, various processes operating on behalf of a consumer (e.g., a downloadable (e.g., self-adapting) client of the queue service, a plugin, instructions from a software development kit (SDK), or the like) poll the message service for a message or for a batch of the messages. The self-adapting client may be configurable to instantiate one or more workers that each poll the messaging service for messages.

For example, a client may be instantiated with a number of workers that is appropriate for an expected processing load for an application that processes the messages. In some embodiments, the client may be instantiated with enough workers to handle a maximum workload, even though many of those workers go without messages some of the time. In some such systems, the instantiated workers that are not receiving messages of the queue service still poll the message service on a regular interval (e.g., in between periods of sleep) in order to be responsive when messages appear at the service. In some embodiments, the message service responds with empty responses (empty receives) even when there are no messages.

Both of the polling messages and the corresponding empty receives can tie up network resources to transmit and receive. In some such systems, an administrator of the system may reduce the amount of time the workers sleep in-between polls in order to reduce message response time. A significant increase in network traffic (as well as an increase in processing at the message service and the consumer client, in embodiments) is experienced in some such systems where all of the workers are configured with short sleep times, even when there are little to no messages to process.

Described herein is a self-adapting client and corresponding self-adapting technique of managed scaling of workers that reduces the amount of network traffic, in some embodiments (e.g., network traffic is reduced when compared to other systems that don't implement the disclosed technique, even when messaging traffic is relatively low in both systems). Additionally, reduced processing at the message service and the consumer client may be experienced, in embodiments. In some embodiments, instead of over-provisioning with enough workers to handle high workloads, even at points in time when the workloads are not needed, the disclosed client dynamically self-adapts to message flow, without an external manager. For example, the message client may rapidly adjust to the load of messages from the message queue by scaling the number of workers that obtain and process the messages from the message service (e.g., without instruction from an entity external to the client such as the messaging service, in embodiments). In some embodiments, the self-adapting characteristic of the client (the scaling of the number of workers in response to messages) is performed without any central control external to the client. In other embodiments, the workers described herein may self-adapt to the messages in the queue and may not be managed by or receive instructions from a central control system (e.g., instructions to activate or de-activate). In contrast, systems that rely upon an exponential back off technique are centrally controlled by a control system external to the worker client.

While items in a queue may have a storage life, consumers generally desire quick response times. Improved response times are generally achieved via increasing the number of consumer workers processing items from the queue and/or via increasing the frequency of the polling (e.g., using an exponential back off algorithm). However, such configurations can mean that the polling rate remains about the same even when the queue is empty, causing an unnecessarily high rate of empty polling responses ("empty receives").

Messaging Service Example

While the following embodiments are for a messaging service, a messaging service is just one example of a service that can implement managed scaling. Generally, for a messaging service, a consumer application may obtain messages from the message service via polling. For example, an application may periodically check a message service queue for messages, and the time period between the periodic checks may consumer-configurable. It is contemplated that, in various embodiments, the time period between checks may vary (e.g., every few seconds, microsecond, every cycle, etc., as just a few non-exhaustive examples) without limitation. When the queue has messages, a batch of the messages is returned, processed by the consumer application and acknowledged and/or deleted. For example, the application or self-adapting client may send a message to the queue indicating that the message has been process and can be deleted from the queue. When the queue has no messages, an empty response (an empty poll response) is returned. In some systems, a customer may be charged for each response, whether the response is empty of includes a batch of messages.

In some embodiments, the techniques disclosed herein may cause a cascading effect that ramps up the number of workers in response to messages in the queue, and also ramps down the number of workers in response to a lack of messages in the queue. The increase and decrease of workers may be exponential in either direction, in other embodiments.

In some embodiments, the techniques and logic disclosed herein may be captured in program instructions and provided to clients in the form of a download over a network. For instance, a client may obtain the program instructions from the queue service (e.g. from the message service). In other embodiments, the logic described herein may be captured in program instructions as part of an SDK, such as an SDK for a messaging service.

FIGS. 1A-1E illustrate a system that dynamically scales to changes in message flow, according to at least some embodiments. In at least the depicted embodiments, messages are illustrated in boxes with the letter M and the system generally transports the message from the producer 102 on the left to the application 114 of the consumer system 110 on the right. Various components of FIGS. 1A-1E, 2A-B, 4, 6, 7 and 8 may perform some or all of the steps illustrated in the processes depicted in FIGS. 3A-B and 5, described below. As an example, self-adapting client 112 may perform at least one of the steps illustrated in FIGS. 3A-B and 5. The steps depicted in FIGS. 3A-B and 5 and described below may be performed by other components, in various embodiments.

FIGS. 1A-1E illustrate producer(s) 102 and consumer system(s) 110. Generally, a producer 102 generates messages or other data that is sent to the queue 104 (e.g., a message service). A non-exhaustive list or producers includes any of processes of an enterprise system, cloud-based system (such as service provider network 700 in FIG. 7), service of the service provider network such as database service 702, compute service 706, other storage service 708, or other producer 704 may produce data for the queue. In some embodiments, clients 112 or processes executing on client networks 730 external to a service provider network 700 may generate and transmit data to the queue (e.g., to queue service 104).

Generally, consumer system 110 consume the messages or data produced by the producer 102. A non-exhaustive list of consumers includes any of processes of an enterprise system, cloud-based system (such as service provider network 700 in FIG. 7), service of the service provider network such as database service 702, compute service 706, other storage service 708, or other producer 704 may consume data from the producers 102. In some embodiments, clients 112 or processes executing on client networks 730 external to a service provider network 700 may consumer data from the producers (e.g., via the queue (e.g., to queue service 104)).

Figure 1C:
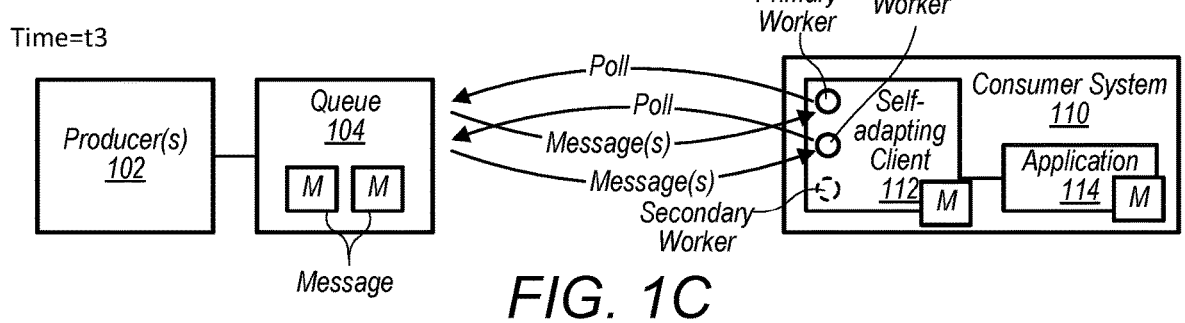
Figure 1D:
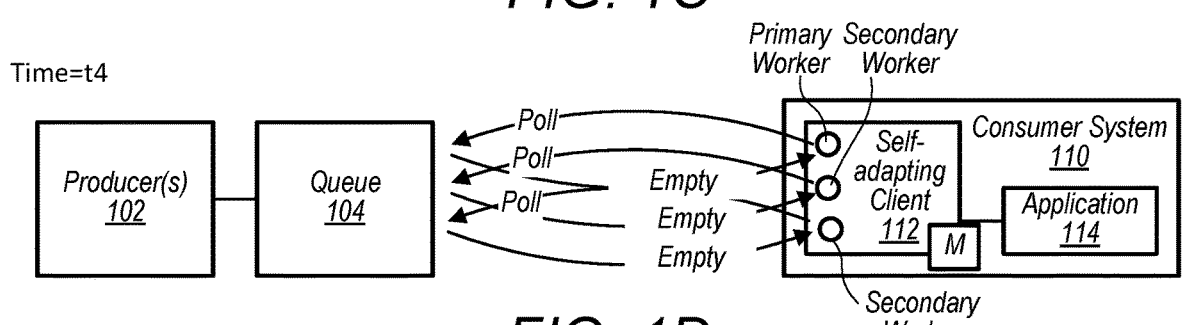
Figure 1E:
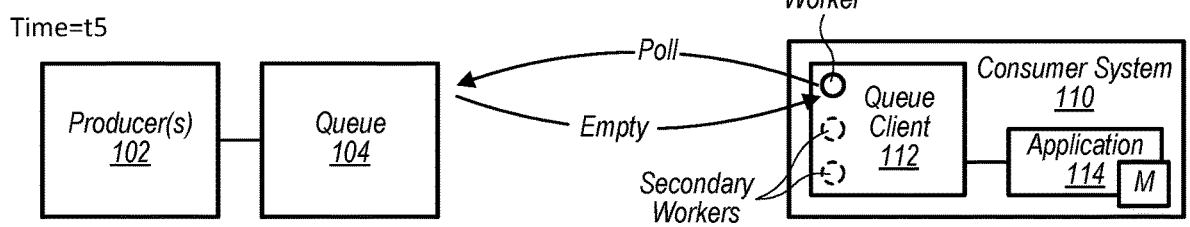

In FIG. 1A, a primary worker and two secondary workers are instantiated on a self-adapting client 112. Two different types of workers are illustrated, primary workers (generally active, in embodiments, irrespective of the amount of messages) and secondary workers (generally inactive or sleeping when there are not messages, but rapidly scaled up and active in response to messages). In some embodiments, a client or a client application may be configured with a single primary worker and a pool of secondary workers. FIG. 1A illustrates that the primary worker (indicated as active by the complete circle) of the self-adapting client 112 polls a queue 104 (e.g., a simple queue, or a message service, etc.). In some embodiments, when there are no messages (FIG. 1A) or the number of messages in queue 104 is low, the self-adapting client 112 may include only a single primary worker that polls the message service. If no messages are received, the primary worker may wait some configurable amount of time (or not) and again poll the queue 104 for messages. Once a corresponding response is received with one or more messages (e.g., FIG. 1B), the primary worker may activate one of the sleeping secondary workers (secondary workers are illustrated as sleeping by the dashed circle) to get that secondary worker to start polling and receiving messages (FIG. 1C). If the activated worker receives messages, it may activate another secondary worker (FIG. 1D). If the activated (illustrated with the solid circle) secondary worker(s) polls and receives an empty receive (FIG. 1D), the secondary worker(s) may go back to inactive (FIG. 1E), while the primary worker continues to poll, irrespective of whether there are messages at the queue or not. As illustrated in FIGS. 1D-1E, scaling of the number of workers may be exponential in activation of de-activation. In at least some embodiments, the workers may be programmed according to logic that causes the workers to activate other workers according to various alternative logic. For instance, the logic may cause every other worker to not always activate another secondary worker. The logic may cause only every other secondary worker or every third secondary worker to activate another secondary worker. It is contemplated that in at least in some embodiments, a primary worker does not itself receive or process messages, but instead only polls the queue to determine if there are messages in the queue, and wakes a secondary worker that obtains and process the messages in the queue on behalf of the primary worker.

In some embodiments, a primary worker or a secondary worker may respond to polling responses that have less than some threshold value of messages. For instance, queue 104 (e.g., a message service) may be configured to respond to polling requests with a batch of one or more messages. Batch size may vary (e.g., 10, 100, 1000, without limitation), in embodiments. The queue may be configured with a maximum batch size. In some such systems, the queue 104 may respond with an empty polling response, a full polling response (full up to the max threshold quantity of messages) or a partial polling response (some quantity less than the max threshold quantity of message). In at least some embodiments, when a primary worker receives a polling response with at least one message, but less than the max threshold quantity of messages, instead of activating a sleeping secondary worker from the pool, the system may respond as though no messages were received (e.g., waiting a configurable amount of time (block 308), and then repolling without activating a secondary worker (block 304)). Such techniques may recognize that a polling response that includes some messages, but less than the max threshold quantity means that this polling response has cleared all of the messages from the queue and it is not necessary to activate a secondary worker, because there are currently no more messages in the queue.

In some embodiments, the systems disclosed herein provide techniques that react to actual queue traffic to determine how many consumer threads or workers to trigger. Such techniques may adaptively manage the number of threads to minimize the amount of empty receives while maintaining quick responses to items in the queue, instead of by managing the polling frequency. The type of polling may be configurable.

For example, either of short polling (e.g., the queue does not wait to respond, irrespective of whether there are messages or not) or long polling (e.g., if a full batch of messages is not immediately ready, the queue waits some, perhaps configurable, amount of time to see if messages show up before responding) may be implemented. In one non-limiting example, long polling may be used by one type of worker (e.g., a primary worker) while short polling may be used by the other types of workers (e.g., secondary workers). The message queue may respond to a poll with one or more of the messages in the queue (e.g., with a single message or a batch of a number of messages, up to some configurable threshold). For instance, the messaging service may be configurable via an interface to set a batch size of messages to deliver in response to a poll. In some embodiments, the poll message may indicate the number of messages the worker is requesting and the queue may respond with up to that number of messages. It is contemplated that in at least some embodiments, the batch size or the configurable threshold could be different for different workers (e.g., a primary worker is given a quantity of messages that is different from the quantity of messages given to a secondary worker).

In some embodiments, short polling is implemented by setting a wait time parameter to zero such that the queue does not wait before responding with an empty polling response. In other embodiments, long polling is implemented by setting a timeout value up to some configurable maximum threshold. According to the long polling technique, the queue may still respond without waiting if a full batch of messages is available for the response, but will wait for a period of time corresponding to the timeout value when there are no messages or when the messages are less than the batch maximum before responding to the poll, in embodiments. The queue waits for the period of time for additional messages to fill the batch to a maximum quantity, or to see if any messages show up at all during the duration of the timeout period.

The self-adapting client 112 may operate on concert with a consumer system 110 application 114. For example, the self-adapting client 112 itself may store messages and wait for the application 114 to request those messages. In another example, the self-adapting client 112 may push the messages to the application 114 (e.g., as soon as the messages are received by the client or when the number of messages at the self-adapting client reaches a configurable threshold).

Figure 2A:
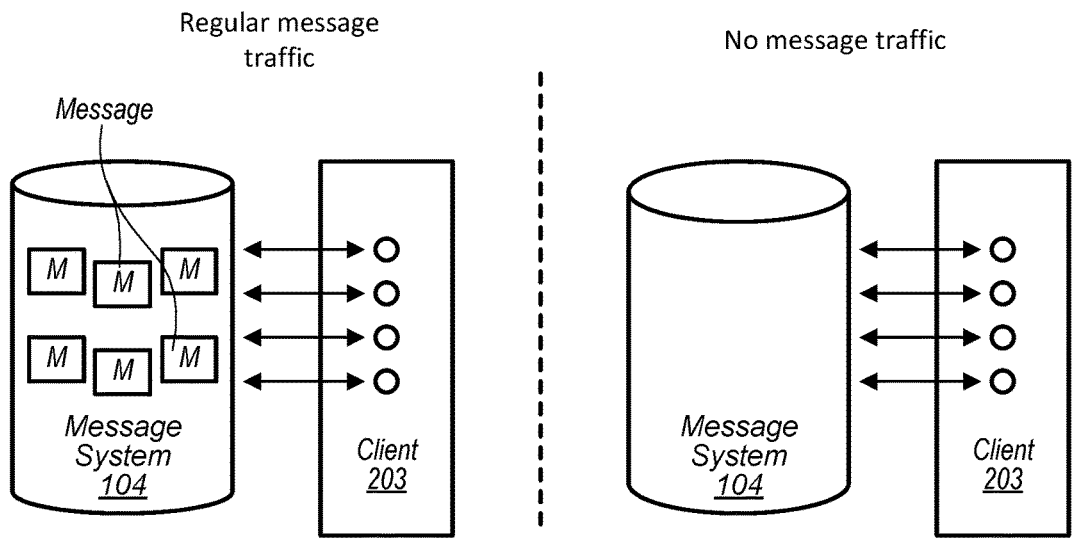
FIG. 2A is a block diagram illustrating an example system that does not dynamically self-adapt in order to scale to changes in message flow, according to at least some embodiments.

FIG. 2A is a block diagram illustrating an example system that does not dynamically scale to changes in message flow, according to at least some embodiments. It illustrates that in a system where all workers poll, irrespective of message traffic, there is significant traffic of empty receives even when there is little-to-no message traffic.

In at least the illustrated embodiment, the left side of FIG. 2A ("Regular message traffic") depicts that, when the message system 104 has messages, each worker of client 203 is polling and receiving batches of messages from message system 104. The right side of FIG. 2A ("No message traffic") illustrates that, when message system 104 does not have messages, each worker of client 203 continues to poll the message system 104. In the no message traffic state illustrated in FIG. 2A (when message system 104 has no messages), even though each worker of client 203 is receiving an empty receive, each worker continues to poll every so often.

Figure 2B:
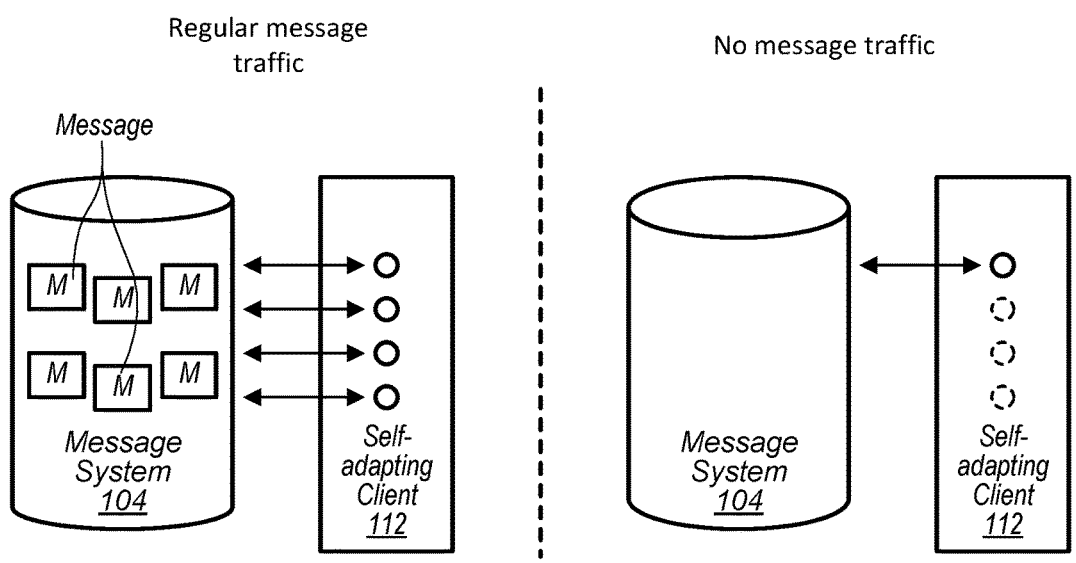
FIG. 2B is a block diagram illustrating an example system that does dynamically self-adapt to scale to changes in message flow, according to at least some embodiments.

In contrast, FIG. 2B is a block diagram illustrating an example system that does dynamically scale to changes in message flow, according to at least some embodiments. It illustrates that in an example of a single primary worker that wakes other secondary workers when there are messages to process, network traffic due to empty receives is reduced when there are no messages, but also quickly scales the number of workers in response to message traffic. The left side of FIG. 2B, "Regular message traffic") illustrates that when message system 104 has messages, each worker of the self-adapting client 112 is processing messages from message system 104. The right side ("no message traffic") of FIG. 2A illustrates that the number of workers of self-adapting client 112 processing messages is reduced when the message system 104 has no messages. In at least the illustrated embodiment, the number of workers is driven by the existence of messages in the message system 104. In the illustrated embodiment, when the message system 104 is empty, there is one single thread of self-adapting client 112 polling every so often (e.g., every x seconds or some other increment of time, without limitation). This one single thread will remain "awake" even if no messages are retrieved. In some embodiments, as soon as the one single thread retrieves one or more messages, it "wakes up" another thread, which in turn starts polling for messages.

Figure 3A:
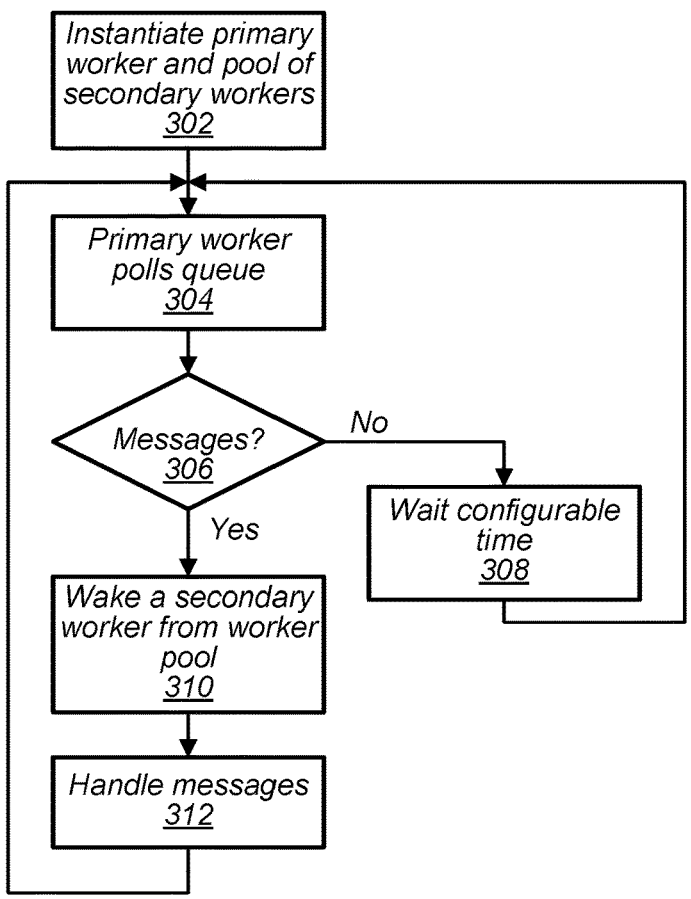
FIGS. 3A-B are flow charts illustrating a technique for managed scaling of a processing service, according to one embodiment.
Figure 3B:
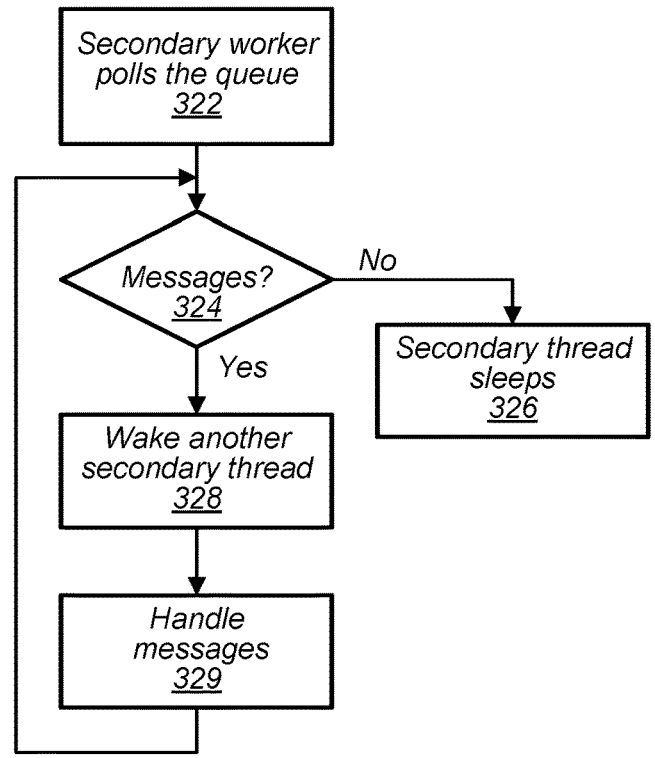

FIGS. 3A & 3B are flow charts illustrating a technique for managed scaling of a processing service, according to at least some embodiments. In some embodiments, some of the steps illustrated in FIG. 3A may be implemented by a primary worker of a self-adapting client 112 (e.g., the self-adapting client in FIGS. 1A-1E, 4, 6, 7B, 8 and 9) while some of the steps illustrated in FIG. 3B may be implemented by a secondary worker of a self-adapting client 112 (e.g., the self-adapting client in FIGS. 1A-1E, 4, 6, 7B, 8 and 9).

As illustrated, at block 302, a primary worker and a pool of secondary workers is instantiated. In some embodiments the worker pool is instantiated in a process distinct from the execution of the corresponding application (e.g., by a script or otherwise), although the worker pool may be instantiated in response to instructions from execution of the corresponding application. In some embodiments, the worker pool and corresponding application may be instantiated in parallel, based upon a startup script.

Generally, the pool of secondary workers is implemented on the same client 112 as the primary worker. However, in some embodiments a pool of secondary workers managed by the primary worker or by the corresponding lead client 112a may be distributed across more than one client (e.g., FIGS. 4 and 5, described below).

The primary worker polls the queue (block 304), for example, primary worker of client 112 in FIG. 1A polls the queue 104 that has received or obtained messages M from producer 102. If there are no messages (decision 306, no) the primary worker waits a configurable amount of time before polling the queue again (block 304), for example, when the queue 104 responds with an empty receive (e.g., a response from the queue with no messages), the primary worker may wait some period of time before polling again.

If there are messages (decision 306, yes) the technique includes waking a secondary worker from the worker pool, for example, when the primary worker of self-adapting client 112 receives a response from the queue 104 with one or more messages, the primary worker may trigger one of the secondary workers to wake from a sleep state (and begin polling the queue, as illustrated in FIG. 3, in embodiments). The messages are handled (block 312). For example, the self-adapting client 112 may place the received messages in a queue maintained by the self-adapting client 112 until the application 114 requests the messages, or the self-adapting client 112 may send the received messages to the application 114. Steps of the illustrated process may be performed on other sequences (e.g., blocks 310 and 312 may be performed in reverse order).

As explained above, FIG. 3B is a flow chart illustrating a technique for managed scaling of a processing service that may be implemented by one or more of the secondary workers, according to at least one embodiment. The illustrated process may be triggered by the primary worker triggering one of the secondary workers to wake from the pool of sleeping secondary workers (described above, in FIG. 3A). At block 322, a secondary worker (e.g., a secondary worker of client 112 in FIG. 1C) polls the queue 104. If there are no messages (diamond 324, no) the secondary thread may go back to sleep in the pool of secondary workers. But, if there are messages, (diamond 324, yes) the secondary worker wakes another secondary thread (block 308) and handles the messages (block 329). For example, in FIG. 1C, the secondary worker has received messages from the queue 104. In some embodiments, that secondary worker may wake another one of the secondary workers to poll the queue 104 (not illustrated). Steps of the illustrated process may be performed on other sequences (e.g., blocks 328 and 329 may be performed in reverse order, in some embodiments).

Figure 4:
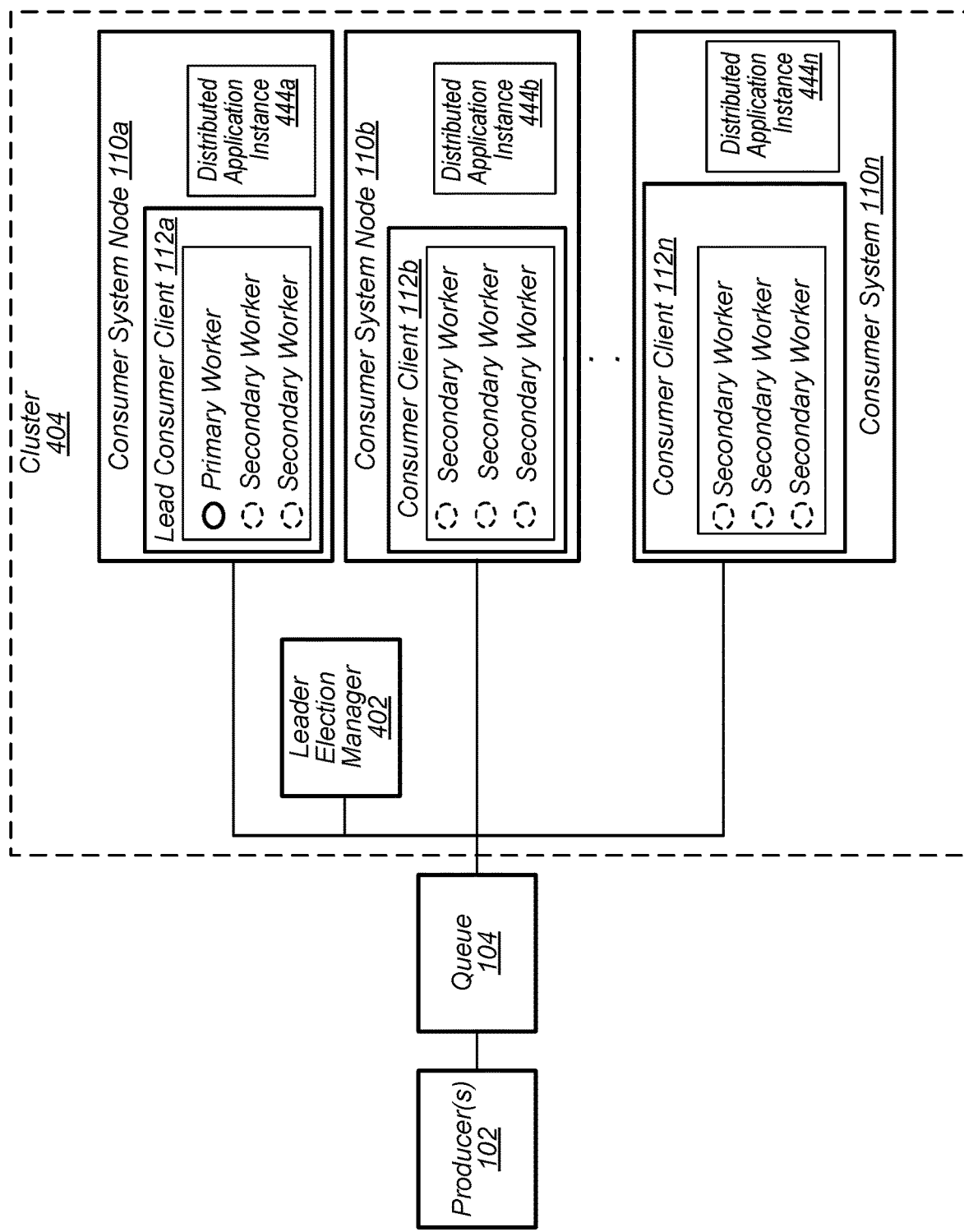
FIG. 4 is a block diagram illustrating a system including a cluster that implements managed scaling of a processing service, according to one embodiment.

FIG. 4 is a block diagram illustrating a system that implements managed scaling of a processing service across a cluster of consumer system nodes 110 that each comprise a client 112, according to one embodiment. In the illustrated embodiment, cluster 404 includes consumer system nodes 110a-110n with corresponding clients 112a-n and distributed application instances 444a-n, and leader election manager 402. In some embodiments, leader election manager 402 implements a technique that designates a single process of the cluster as the organizer of tasks distributed among several consumer systems 110a-n. For example, in the illustrated embodiment, lead consumer client 112a is designated as the single process of the cluster that organizes which secondary workers of consumer systems nodes 110a-n activate the next secondary worker when messages are returned from the queue 104. In some embodiments, even though each node 110 of the cluster 404 has a respective consumer client, only lead consumer client 112a has a primary worker. The other clients 112b-n do not have respective primary workers, thereby further reducing network traffic and processing of empty poll responses even further because these clients 112b-n do not generate any network traffic when there are no messages (e.g., compared to the workers of client 203, that continuously generated network traffic, whether there are messages at the queue or not). In at least the illustrated embodiment, instances (444a-n) of distributed application 444 are distributed across the nodes 110 and consume messaged from respective clients 112.

Figure 5:
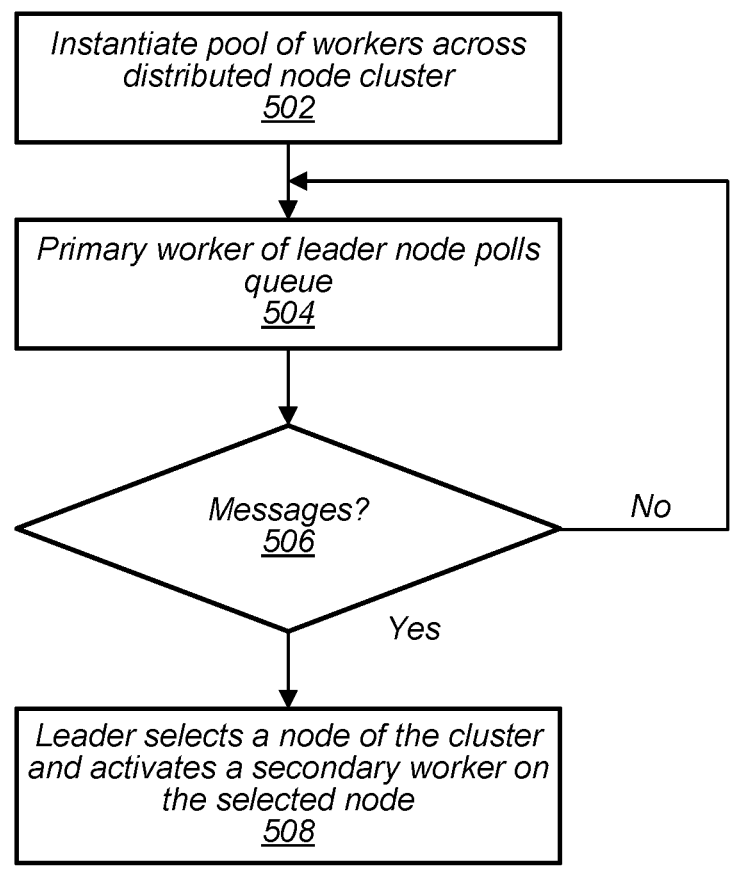
FIG. 5 illustrates a flow chart illustrating a technique for managed scaling of a processing service for a cluster, according to one embodiment.

FIG. 5 illustrates a flow chart illustrating a technique for managed scaling of a processing service that may be appropriate within the context of a cluster of consumer nodes such as those illustrated in FIG. 4, described above, according to one embodiment. At block 502, a pool of workers is instantiated across a distributed node cluster, such as the cluster illustrated in FIG. 4. The pool of workers may be instantiated in accordance with instructions from the lead consumer client 112a, in embodiments. At block 504, the primary worker of the leader node (e.g., consumer client 112a) polls the queue (e.g. queue 104) and if there are no messages (decision 506, no), it may wait some period of time before polling, or immediately poll, the queue again. If there are messages (decision 506, yes) the leader selects a node of the cluster and activates a secondary worker on the selected node (block 508). Node selection may be performed in a round robin manner, or the like, in embodiments.

It is contemplated that in some embodiments, the determination at decision 506 (e.g., are there messages in the queue?) may be based upon a threshold number of messages. For instance, instead of waiting only when there are no messages, the system may wait some period of time (without selecting a node and activating a secondary worker) when the number of messages in the queue (or in the poll response) is below some threshold value of messages. In such embodiments, the process may continue to block 508 (select a node of the cluster and activate a secondary worker on the second node) only when the number of messages in the queue (or in the poll response) is above the threshold value. The threshold value may be a default or configurable as non-exhaustive examples Similar to the technique illustrated in FIG. 3B, a secondary worker in the distributed system illustrated in FIG. 4 may go back to an inactive state in the pool of secondary workers when the secondary worker receives a polling response with no messages (or less than some threshold, in embodiments). Although in at least some embodiments, workers self-regulate going inactive and back into the pool of inactive workers (e.g., they are not instructed to sleep by an outside source), it is contemplated that in some embodiments, some entity external to the worker or external self-adapting client may instruct the workers to go inactive, in a round robin manner, or the like.

Figure 6:
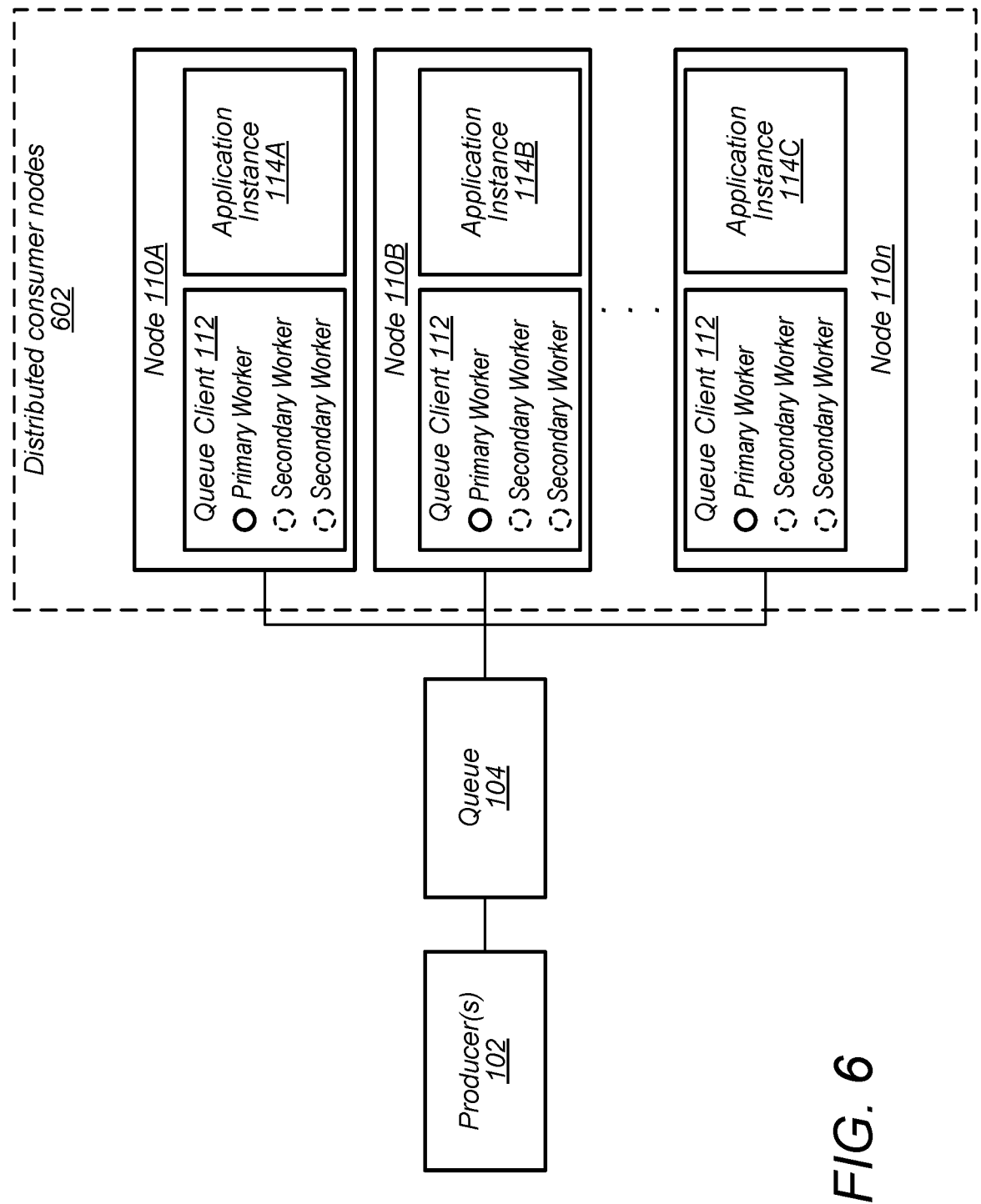
FIG. 6 is a block diagram illustrating a system that implements managed scaling of a processing service in a distributed system, according to one embodiment.

FIG. 6 is a block diagram illustrating a system that implements managed scaling of a processing service, according to one embodiment. In the illustrated embodiment, each of the nodes 110 include respective queue clients 112, each with a respective primary worker and pool of secondary workers that self-adapt to the number of messages coming from the queue 104. Each queue client may scale workers in accordance with the techniques illustrated in FIGS. 3A-B. In embodiments, the queue 104 may decouple the process of the producer(s) 102 from the process of the consumer(s) nodes 602 in time (e.g., the processes may execute independently while still interfacing with each other).

Figure 7:
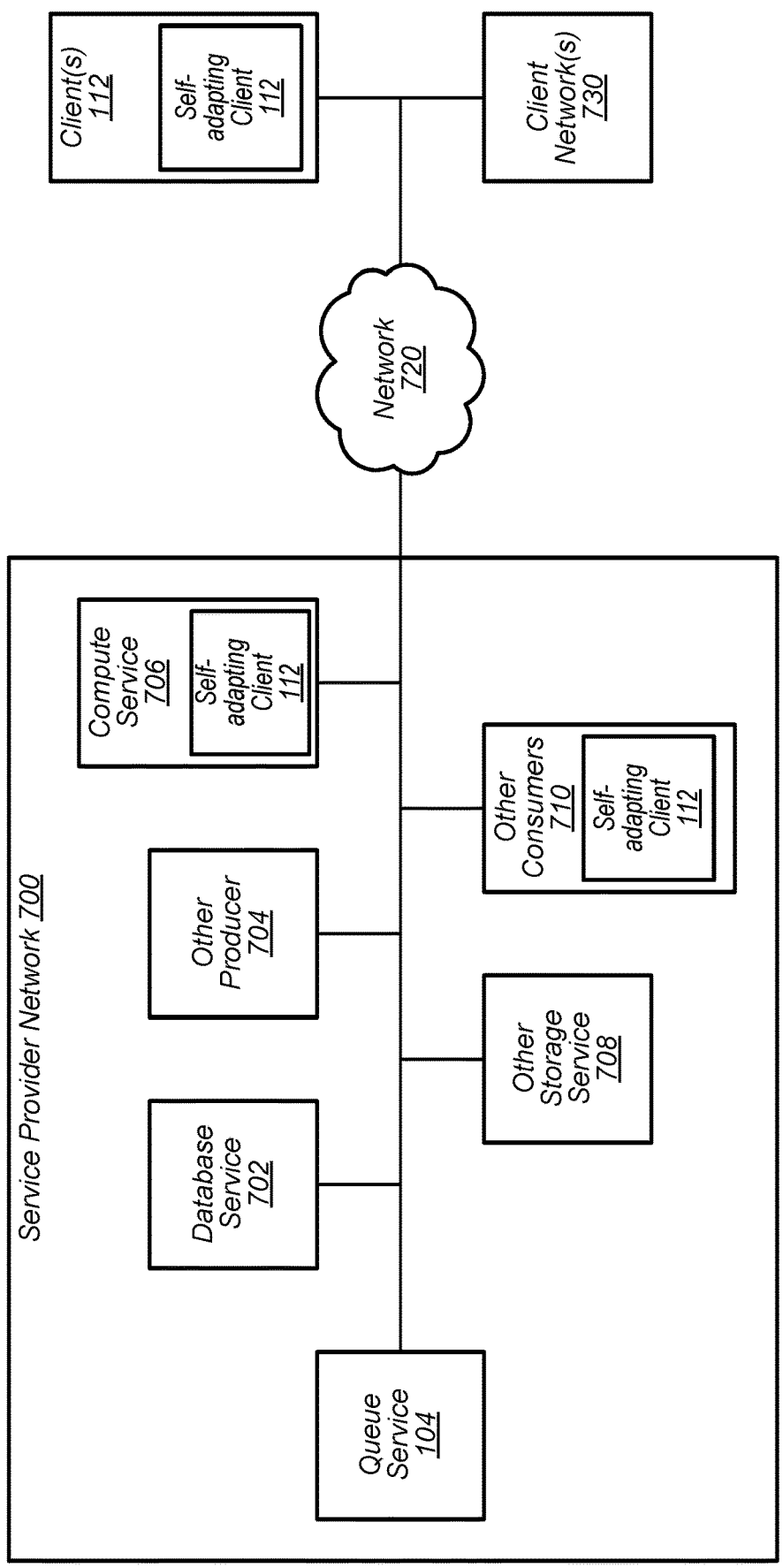
FIG. 7 is a block diagram illustrating a service provider network environment configured to implement at least a portion of a system that includes a self-adapting client, and a queue service, according to various embodiments.

FIG. 7 is a block diagram illustrating a service provider network environment configured to implement at least a portion of a system that includes a self-adapting client, and a queue service, according to various embodiments. FIG. 7 illustrates a service provider network 700 comprising a queue service 104, database service 702, other producers 704, compute service 706 (with self-adapting client 112, in the illustrated embodiment), other storage service 708 and other consumers 710 (with a self-adapting client 112, in the illustrated embodiment). The service provider is illustrated as connected to clients 112 (including self-adapting client 112) and client networks 730 across network 720. Various of the depicted entities may be either producer 102 or consumers 110, in embodiments. Client networks 730 may include other service providers, in embodiments, and/or enterprise systems.

Illustrative System

Figure 8:
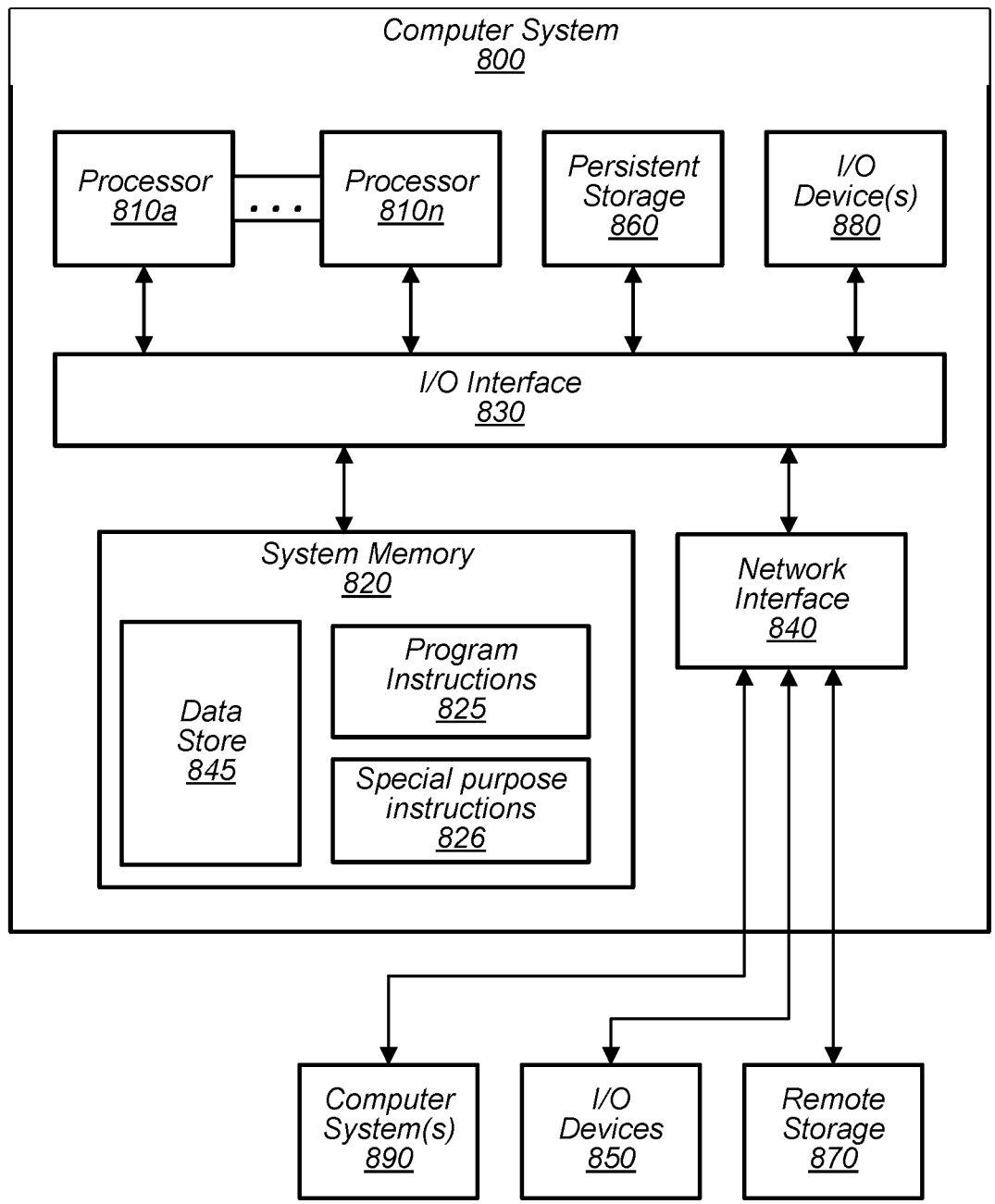
FIG. 8 is a block diagram illustrating a computer system configured to implement at least a portion of a system that includes managed scaling of a processing service, according to various embodiments.

Any of various computer systems may be configured to implement processes associated with a system that implements managed scaling of a processing service. For example, FIG. 8 is a block diagram illustrating one embodiment of a computer system suitable for implementing some or all of the techniques and systems described herein. For example, each of the computer systems may host one or more producers 102, queues 104, clients 112 (e.g., self-adapting clients), consumer systems 110 (e.g., consumers nodes), services of a service provider network 700 (e.g., database service 702, compute service 706, other storage service 708, other consumer 710) or clients thereof (e.g., clients 112 or client networks 730. In some cases, a host computer system may host multiple virtual instances that implement the workers one or more producers 102, queues 104, clients 112 (e.g., self-adapting clients), consumer systems 110 (e.g., consumers nodes), services of a service provider network 700 (e.g., database service 702, compute service 706, other storage service 708, other consumer 710) or clients thereof (e.g., clients 112 or client networks 730. However, the techniques described herein may be executed in any suitable computer environment (e.g., a cloud computing environment, as a network-based service, in an enterprise environment, etc.).

Various of the illustrated embodiments may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing service provider logic, enterprise logic, or downloadable applications, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data (e.g., in a data store 845) accessible by processor 810. In various embodiments, system memory 820 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 820 as program instructions 82. In some embodiments, system memory 820 may include data in a data store 845 and/or program instructions 825 and/or special purpose instructions 826, which may be configured as described herein. In some embodiments, data store 845 may store the message of the queue 104, for example. In some embodiments, special purpose program instructions 826 may include instructions that implement the self-adapting client 112, described herein, or queue 104, or application 114 or any one of the producers 102 or consumer systems 110, for example.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client device (e.g., 780) and other computer systems, or among hosts (e.g., hosts of a service provider network 710), for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the self-adapting client 112 to perform managed scaling of a processing service), other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims.

As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based at least in part on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the self-adapting client 112, queue 104, other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electro-magnetic, or digital signals, conveyed via a communication medium such as network and/or a wireless link.

What is claimed is:

1. A system comprising:
one or more computing devices comprising respective processors and respective memory to implement a message retrieval client that comprises a primary worker and a pool of secondary workers:
the primary worker to:
periodically poll a queue service for one or more messages;
in response to receipt of a threshold quantity of messages, activate a secondary worker of the pool of secondary workers; and
in response to receipt, from the queue service, of a poll response with less than a threshold number of messages, continue to periodically poll the queue service;
each of the secondary workers to:
when active, periodically poll the queue service for one or more messages;
in response to receipt of the threshold quantity of messages, activate another secondary worker of the pool of secondary workers; and
in response to receipt of an empty poll response from the queue service, return to an inactive state in the pool.

2. The system as recited in claim 1, wherein:
to periodically poll the queue service for the message the primary worker is to periodically long poll the queue service, wherein for a long poll, the queue is to:
for a case where a full batch of messages is available from the queue service, respond to the poll with the full batch of messages, and
for the cases where there are no messages or where there is not yet a full batch of messages available from the queue service, wait a specified time period for additional messages and include the additional messages in the response to the poll; and
to poll the queue service for the message the secondary worker is to short poll the queue service, wherein for a short poll, the queue is to:
respond to the poll without waiting, either with or without messages from the queue.

3. The system as recited in claim 1, wherein
the pool of workers comprises a software thread pool of software threads, and a number of software threads in the thread pool is regulated by a maximum quantity threshold, the maximum quantity threshold either configurable via an interface or determined based on the ability of the underlying resources to support the maximum quantity of threads.

4. The system as recited in claim 1, further comprising a multi-tenant service provider network, wherein said one or more computing devices comprising respective processors and memory to implement the message retrieval client are part of the multi-tenant service provider network;
wherein the multi-tenant service provider network provides the queue service to clients of the service.

5. A method comprising:
performing, by one or more computing devices:
periodically polling, by a primary worker of a client, a message service for one or more messages;
in response to receiving, by the primary worker, an empty poll response from the message service, the primary worker continuing to periodically poll the message service;
in response to receiving, by the primary worker, an indication of one or more messages at the message service, activating a secondary worker of a pool of secondary workers of the client;
periodically polling, by the activated secondary worker, the message service for one or more messages; and
in response to receiving, by the activated secondary worker, an empty receive response, the secondary worker returning to an inactive state in the pool.

6. The method as recited in claim 5, further comprising:
handling, by the primary worker, the one or more received messages, wherein handling the one or more received messages comprises:
storing the one or more received messages on behalf of a consumer process that requests the one or more received messages; and
transmitting, in response to a request for messages from the consumer process, the one or more received messages.

7. The method as recited in claim 6, wherein the received batch of messages in the polling response received by the activated secondary worker is less than a maximum threshold quantity of messages for the batch of messages, the method further comprising:
in response to receiving, by the activated secondary worker, the polling response with less than a maximum threshold quantity of messages, the activated secondary worker:
discontinuing the periodic polling of the message service, and
returning to an inactive state in the pool.

8. The method as recited in claim 5, further comprising:
in response to receiving, by the activated secondary worker, a polling response with a batch of messages, the secondary worker:
activating another secondary worker of the pool of secondary workers,
continuing to periodically poll the message service, and
handling the received batch of messages.

9. The method as recited in claim 5,
wherein periodically polling, by the primary worker, the message service for the message comprises the primary worker periodically long polling the message service, wherein long polling comprises:
for a case where a full batch of messages is available from the message service, respond to the poll with the full batch of messages, and
for the cases where there are no messages or where there is not yet a full batch of messages available from the message service, wait a time period for additional messages and include the additional messages in the response to the poll; and
wherein periodically polling, by the secondary worker, the message service for the message includes the secondary worker periodically short polling the message service, wherein periodically short polling comprises:
receiving immediate responses to the short polling, irrespective of whether the polling responses include messages.

10. The method as recited in claim 5,
wherein said in response to receiving, by the primary worker, one or more messages, activating the secondary worker of a pool of secondary workers of the client comprises:
receiving a complete batch of messages, a complete batch determined based at least in part on a threshold quantity of messages, and
activating the secondary worker of the pool of secondary workers based at least in part on receiving the complete batch of messages.

11. The method as recited in claim 5, wherein the threshold quantity of messages is a configurable parameter or is specified in the polling request.

12. The method as recited in claim 5, wherein the primary worker does not receive or handle the one or more messages at the message service, but the activated secondary worker does receive and handle the messages at the message service on behalf of the primary worker.

13. The method as recited in claim 5, wherein the length of the period of time between polling is a configurable parameter.

14. A non-transitory computer readable storage medium storing program instructions that, when executed by a computer, cause the computer to perform:
periodically polling, by a primary worker, a message service for one or more messages;
in response to receiving, by the primary worker, an empty poll response from the message service, the primary worker continuing to periodically poll the message service;
in response to receiving, by the primary worker, one or more messages, activating a secondary worker of a pool of secondary workers;
periodically polling, by the activated secondary worker, the message service for one or more messages; and
in response to receiving, by the activated secondary worker, an empty poll response, the secondary worker returning to an inactive state in the pool.

15. The non-transitory computer readable storage medium as recited in claim 14, wherein the program instructions cause the computer to further perform:
handling, by the primary worker, the one or more received messages, wherein handling the one or more received messages comprises:
storing the one or more received messages on behalf of a consumer process that requests the one or more received messages; and
transmitting, in response to a request for messages from the consumer process, the one or more received messages.

16. The non-transitory computer readable storage medium as recited in claim 14, wherein the program instructions cause the computer to further perform:
implementing the primary worker and the secondary worker as software threads that obtain and handle the messages from the message service.

17. The non-transitory computer readable storage medium as recited in claim 14, wherein the program instructions further cause the computer to implement a client comprising the primary worker and the pool of secondary workers, the client to further perform:
receiving a request from a consumer process that consumers the messages; and
providing the one or more messages to the consumer process that consumers the messages.

18. The non-transitory computer readable storage medium as recited in claim 14, wherein the program instructions further cause the computer to, perform:
said activating the secondary worker of the pool of secondary workers to periodically poll the message service, and
said in response to receiving, by the activated secondary worker, the empty poll response, the secondary worker returning to the inactive state in the pool,
in a manner that scales the pool of secondary workers exponentially.

19. The non-transitory computer readable storage medium as recited in claim 14, wherein the program instructions further cause the computer to perform:
in response to receiving, by the secondary worker, a batch or one or more messages from the message service:
continuing to poll the message service for one or more messages,
handling the batch of one or more messages, wherein handling the batch of messages includes storing the batch of messages on behalf of a consuming application that consumers the batch of messages, and
activating another secondary worker of the pool of secondary workers.

20. The non-transitory computer readable storage medium as recited in claim 14, wherein the program instructions further cause the computer to further perform:

in response to each of the secondary workers receiving empty poll responses, returning each of the secondary workers to the inactive state in the pool, wherein the secondary workers are returned to the inactive state in the pool without receiving instructions to return to the inactive state from a control system.

* * * * *